(12) United States Patent
Nakanishi et al.

(10) Patent No.: US 7,692,730 B2
(45) Date of Patent: Apr. 6, 2010

(54) LIQUID CRYSTAL DISPLAY DEVICE COMPRISING A SECOND TRANSISTOR BETWEEN SUB-PICTURE ELEMENT ELECTRODES IN EACH PICTURE ELEMENT REGION

(75) Inventors: Yohei Nakanishi, Tenri (JP); Tsuyoshi Kamada, Kawasaki (JP); Hideaki Tsuda, Kanagawa (JP); Hidefumi Yoshida, Kawasaki (JP); Yasutoshi Tasaka, Tokyo (JP); Masakazu Shibasaki, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 306 days.

(21) Appl. No.: 11/439,995

(22) Filed: May 25, 2006
(Under 37 CFR 1.47)

(65) Prior Publication Data
US 2007/0132690 A1    Jun. 14, 2007

(30) Foreign Application Priority Data
May 27, 2005    (JP)    ............................. 2005-156089

(51) Int. Cl.
*G02F 1/136*    (2006.01)
*G02F 1/1343*    (2006.01)

(52) U.S. Cl. ...................... 349/48; 349/143; 349/144; 349/139

(58) Field of Classification Search .................. 349/38, 349/48, 143–144
See application file for complete search history.

(56) References Cited

U.S. PATENT DOCUMENTS

| | | | |
|---|---|---|---|
| 4,840,460 A | 6/1989 | Bernot et al. | |
| 5,126,865 A | 6/1992 | Sarma | |
| 2003/0058374 A1 | 3/2003 | Takeda et al. | |
| 2005/0036091 A1* | 2/2005 | Song | 349/129 |
| 2006/0268186 A1* | 11/2006 | Kamada et al. | 349/38 |

* cited by examiner

*Primary Examiner*—Andrew Schechter
*Assistant Examiner*—Charles Chang
(74) *Attorney, Agent, or Firm*—Birch, Stewart, Kolasch & Birch, LLP

(57) ABSTRACT

The invention relates to a liquid crystal display device including a first transistor, a plurality of sub-picture element electrodes formed in a picture element region, a control electrode formed in capacitance coupling with at least one of the plural sub-picture element electrodes, the control electrode being applied with a display voltage from the first transistor, and an auxiliary capacitance bus line held at a predetermined voltage level and constituting an auxiliary capacitance between the auxiliary capacitance bus line and the control electrode. A second transistor is provided between the sub-picture element electrode coupled with the control electrode by the capacitance coupling and the auxiliary capacitance bus line or between the sub-picture element electrode coupled with the control electrode by the capacitance coupling and the sub-picture element electrode connected to the first transistor.

5 Claims, 15 Drawing Sheets

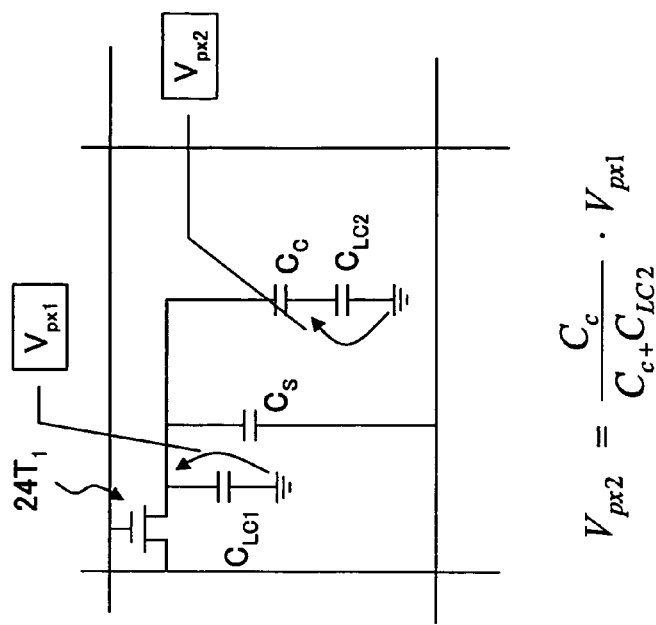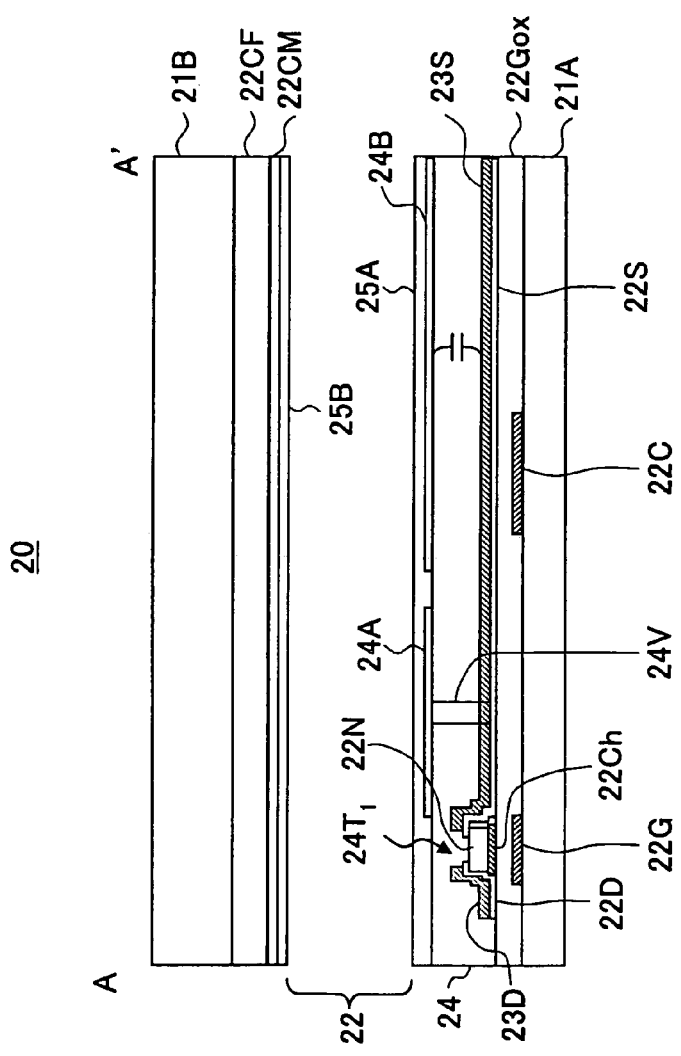

LIQUID CRYSTAL DISPLAY DEVICE COMPRISING A SECOND TRANSISTOR BETWEEN SUB-PICTURE ELEMENT ELECTRODES IN EACH PICTURE ELEMENT REGION

BACKGROUND OF THE INVENTION

The present invention generally relates to liquid crystal display devices and more particularly to a liquid crystal display device having plural sub-picture element electrodes in a single picture element region and a method of suppressing afterimages therein. Particularly, the present invention relates to a liquid crystal display device in which at least one sub-picture element electrode is coupled to a control electrode to which a display voltage is applied via capacitance and the method of suppressing afterimages, or burning of images, in such a liquid crystal display device.

A liquid crystal display device has a compact size in terms of thickness as compared with CRT (cathode ray tube) and has an advantageous feature of low drive voltage and small power consumption. Thus, liquid crystal display devices are used extensively in various electronic apparatuses including television sets, laptop personal computers, desktop personal computers, PDAs (personal digital assistants), cellular phones, and the like.

Particularly, a liquid crystal display device of active matrix type provided with a thin-film transistor (TFT) for each pixel (sub-picture element) for switching element, can provide the display characteristics comparable to those of CRTs in view of its high driving performance, and liquid crystal display devices are now used extensively in the applications where CRT has been used conventionally, such as desktop personal computers or television sets.

Generally, a liquid crystal display device is constructed by two substrates and a liquid crystal confined therebetween. There, one substrate carries picture element electrodes and TFTs thereon in correspondence to the picture elements. On the other substrate, there is formed a common electrode commonly to the picture elements and color filters are formed further thereon in correspondence to the picture element electrodes provided on the first substrate. There are three filter types: red (R); green (G); and blue (B) in such color filters and each picture element carries a color filter of any one color.

Thereby, three picture elements of red (R), green (G) and blue (B) disposed adjacent with each other constitute together a pixel. Hereinafter, the substrate carrying the picture element electrodes and the TFTs will be designated as TFT substrate, and the substrate disposed over the TFT substrate will be designated as opposing substrate. Further, the structure in which a liquid crystal is confined between a TFT substrate and an opposing substrate is designated as a liquid crystal panel.

Conventionally, a so-called TN (twisted nematic) mode liquid crystal display device has been used extensively, wherein a TN mode liquid crystal display device confines a horizontally aligned liquid crystal (a liquid crystal having a positive dielectric anisotropy) between the two substrates with twisted alignment of the liquid crystal molecules.

However, such a TN mode liquid crystal display device has a drawback of poor viewing angle characteristics in that there is caused a remarkable change of contrast and tone of color when the images on the liquid crystal display device is viewed from an oblique direction.

Under these circumstances, there is developed a so-called MVA (multi-domain vertical alignment) liquid crystal display device, wherein a MVA liquid crystal display device is characterized by excellent viewing angle characteristics and is already used in practice.

In such a conventional MVA liquid crystal display device, however, there still occurs a phenomenon that the representation appears whitish when viewed from an oblique direction.

FIG. 1 is a diagram showing a T-V (transmittance-voltage) characteristic of an MVA liquid crystal display device according to a related art for the case of viewing an image represented thereon straight from the front direction and for the case of viewing the image from a direction offset in the upward direction by 60 degrees. In FIG. 1, the horizontal axis represents the applied voltage in terms of volts while the vertical axis represents the transmittance.

As can be seen in FIG. 1, there can occur a situation in which the transmittance takes a larger value when the image is viewed from the oblique direction as compared with the case of viewing the same image from the front direction when a voltage slightly larger than the threshold voltage is applied to the picture element electrode.

FIG. 1 also indicates that the transmittance for the case of viewing the image obliquely becomes smaller than the transmittance value of the case of viewing the image straight, when the applied voltage has exceeded a certain level.

Thus, the difference of brightness between the red picture element, green picture element and blue picture element is decreased when viewed from the oblique direction, and this is the reason why the foregoing problem of whitish representation occurs.

This phenomenon is called discoloration, wherein it should be noted that discoloration takes place not only in MVA liquid crystal display devices but also in TN mode liquid crystal display devices.

U.S. Pat. No. 4,840,460 proposes a technology of dividing a single picture element into plural sub-picture elements and couple sub-picture elements by way of capacitance coupling.

With the liquid crystal display device of this type, the voltage is divided by the ratio of capacitance of the respective sub-picture elements, and it becomes possible to apply different voltages to the respective sub-picture elements. With such a construction, therefore, there apparently exist plural regions of different threshold values of T-V characteristics within a single picture element.

As a result of existence of plural regions having respective, different threshold values of the T-V characteristics in a single picture element, the problem that the transmittance value increases when viewed from an oblique direction over the transmittance value attained for the case of viewing the liquid crystal display device straight from the front direction, is effectively suppressed.

It should be noted that this technology of improving the display characteristics by dividing a single picture element into plural sub-picture elements coupled with each other by way of capacitance coupling is called HT (halftone) gray scale method attained by capacitance coupling. Meanwhile, it should be noted that the liquid crystal display device disclosed by the U.S. Pat. No. 4,840,460 is a TN mode liquid crystal display device.

Japanese Patent 3,076,938 or corresponding Japanese Laid-Open Patent Application 5-66412 discloses a TN mode liquid crystal display device in which a picture element electrode is divided into plural sub-picture element electrodes, and a control electrode is disposed underneath the sub-picture element electrodes via an insulation film.

With this liquid crystal display device, a display voltage is applied to the control electrode via a corresponding TFT.

There, because the sub-picture element electrodes have respective, different sizes, mutually different voltages are applied to the sub-picture element electrodes, and as a result, discoloration is suppressed by the effect pertinent to the HT method.

REFERENCES

Patent Reference 1 U.S. Pat. No. 4,840,460
Patent Reference 2 Japanese Patent 3,076,938

SUMMARY OF THE INVENTION

The inventor of the present invention has discovered, in the investigation that constitutes the foundation of the present invention, that there arises a problem of deterioration of display characteristics as a result of image burning in the case of the foregoing liquid crystal display device that uses the floating sub-picture element electrodes.

FIGS. 2A-2C and FIG. 3 are schematic diagrams explaining the testing method for measuring the degree of image burning.

First, a black-and-white checker pattern shown in FIG. 2A is represented in the liquid crystal display device continuously for a specified time. Thereafter, representation of an intermediate tone shown in FIG. 2B is made over the entire surface of the liquid crystal display device. In the event image burning is caused in the screen, thin image of the checker pattern remains as shown in FIG. 2C.

Thus, the brightness is measured along a X-X line of FIG. 2C, for example, after the display is switched from the representation of the checker pattern to the representation of an intermediate tone, and the image burning rate defined as 100×b/(a+b) is calculated, wherein a represents the brightness of the dark part while b represents the brightness difference between the bright part and the dark part as shown in FIG. 3.

Using the foregoing method, measurement was made for the image burning rate with regard to the liquid crystal display device having a floating sub-picture element electrode and with regard to the liquid crystal display device not having such a floating sub-picture element electrode. As a result, it was indicated that the image burning rate does not exceed 5% for the liquid crystal display device not having a floating sub-picture element electrode, while an image burring rate of 10% or more was observed for the liquid crystal display device having the floating sub-picture element electrode.

In a first aspect, the present invention provides a liquid crystal display device, comprising:

first and second substrates disposed so as to oppose with each other;

a liquid crystal confined between the first and second substrates;

a gate bus line and a data bus line formed on said first substrate;

a first transistor formed on said first substrate and connected to said gate bus line and said data bus line;

a plurality of sub-picture element electrodes formed on said first substrate in a picture element region defined by said gate bus line and said data bus line;

a control electrode formed on said first substrate in capacitance coupling to at least one of said plural sub-picture element electrodes, said control electrode being applied with a display voltage from said data bus line via said first transistor; and an auxiliary capacitance bus line held at a predetermined voltage level and constituting an auxiliary capacitance with regard to said control electrode, a second transistor being provided between said sub-picture element electrode coupled to said control electrode by said capacitance coupling and said auxiliary capacitance bus line or between said sub-picture element electrode coupled to said control electrode by said capacitance coupling and said sub-picture element electrode connected to said first transistor, said second transistor being driven by a signal in a gate bus line different from said gate bus line to which said first transistor is connected, wherein there is provided a gate bus line driving solely said second transistor.

According to a second aspect, the present invention provides a liquid crystal display device, comprising:

first through N-th gate bus lines formed parallel on a substrate;

plural data bus lines formed over said substrate so as to cross said first through N-th gate bus lines via an insulation film;

plural accumulation capacitor bus lines formed over said substrate parallel to said first through N-th gate bus lines;

first and second transistors formed in each stage defined by a gate bus line and in each column defined by a data bus line, each of said first and second transistors having, in each of said stages and columns, a gate electrode connected electrically to said gate bus line and a drain electrode connected to said data bus line;

a first picture element electrode connected, in each of said stages and columns, electrically to a source electrode of said first transistor;

a second picture element electrode connected, in each of said stages and columns, to a source electrode of said second transistor and isolated from said first picture element electrode; and a third transistor provided in each of said stages and columns, said third transistor having, in each of said stages and columns, a gate electrode connected electrically to said gate bus line and a source electrode connected electrically to said second picture element electrode, said third transistor having, in each of said stages and columns, a source region connected to a second picture element electrode of a stage immediately preceding said stage, each of said third transistors further comprising a first buffer capacitance electrode connected electrically to a drain electrode thereof and a second buffer capacitance electrode disposed opposite to said first buffer capacitance electrode via an insulation film and connected to said accumulation capacitance bus lineelectrically, said third transistor being provided also in an (N+1)th stage following said N-th stage in each of said plural columns, said (N+1)th stage having a (N+1)th gate bus line, said third transistor connecting, in said (N+1)th stage, N-th second picture element electrode of said column to a corresponding buffer capacitance, said (N+1)th gate bus line controlling solely said third transistor.

According to the first aspect of the present invention, there are provided two TFTs in each picture element wherein one of the TFTs is used as a switch for supplying a signal voltage to a picture element similarly to a related art while the other TFT is used for dissipating electric charges on the sub-picture elements by connecting sub-picture elements with each other. With this construction, the second transistor, driven by a signal on a gate bus line different from the gate bus line to which the first TFT is connected, is provided between the floating sub-picture element electrode and the auxiliary capacitance bus line, or between the floating sub-picture element electrode and the sub-picture element electrode connected directly to the first TFT. Thereby, the electric charges accumulated in the floating sub-picture element electrode is dissipated to the auxiliary capacitance bus line or to the sub-picture element electrode connected directly to the first TFT with a predetermined timing, and burning of images is prevented. While it is possible to provide a new gate bus line for driving the second TFT, it is preferable to use the gate bus line of the preceding stage for this purpose from the viewpoint of maintaining large aperture.

Thereby, it should be noted that it is not possible to apply the foregoing approach to the picture elements of the stage driven first because of absence of the gate bus line in the preceding stage. Thus, burning of the image is not suppressed in the first stage.

The present invention eliminates this problem of image burning of the first stage, by adding a gate bus line before the first stage.

According to the second aspect of the present invention, three TFTs are provided to each picture element, wherein two of them are used for the switch that supplies a voltage to respective sub-picture elements, while the third TFT is used for dissipating the electric charges of one of the sub-picture elements to the buffer capacitance.

Thus, with the liquid crystal display device comprising: first through N-th gate bus lines formed parallel on a substrate; plural data bus lines formed over said substrate so as to cross said first through N-th gate bus lines via an insulation film; plural accumulation capacitor bus lines formed over said substrate parallel to said first through N-th gate bus lines; first and second transistors formed in each stage defined by a gate bus line and in each column defined by a data bus line, each of said first and second transistors having, in each of said stages and columns, a gate electrode connected electrically to said gate bus line and a drain electrode connected to said data bus line; a first picture element electrode connected, in each of said stages and columns, electrically to a source electrode of said first transistor; a second picture element electrode connected, in each of said stages and columns, to a source electrode of said second transistor and isolated from said first picture element electrode; and a third transistor provided in each of said stages and columns, said third transistor having, in each of said stages and columns, a gate electrode connected electrically to said gate bus line and a source electrode connected electrically to said second picture element electrode, said third transistor having, in each of said stages and columns, a source region connected to a second picture element electrode of a stage immediately preceding said stage, each of said third transistors further comprising a first buffer capacitance electrode connected electrically to a drain electrode thereof and a second buffer capacitance electrode disposed opposite to said first buffer capacitance electrode via an insulation film and connected to said accumulation capacitance bus line electrically, said third transistor being provided also in an (N+1)th stage following said N-th stage in each of said plural columns, said (N+1)th stage having a (N+1)th gate bus line, said third transistor connecting, in said (N+1)th stage, N-th second picture element electrode of said column to a corresponding buffer capacitance, said (N+1)th gate bus line controlling solely said third transistor, it becomes possible to eliminate the problem of image burning in the picture element driven at the end of a frame.

BRIEF DESCRIPTION OF THE DRAWINGS

FIGS. 4A-4C are diagrams explaining the problem addressed by a first embodiment of the present invention;

DETAILED DESCRIPTION OF THE PREFERRED EMBODIMENTS

First Embodiment

Figure 1:
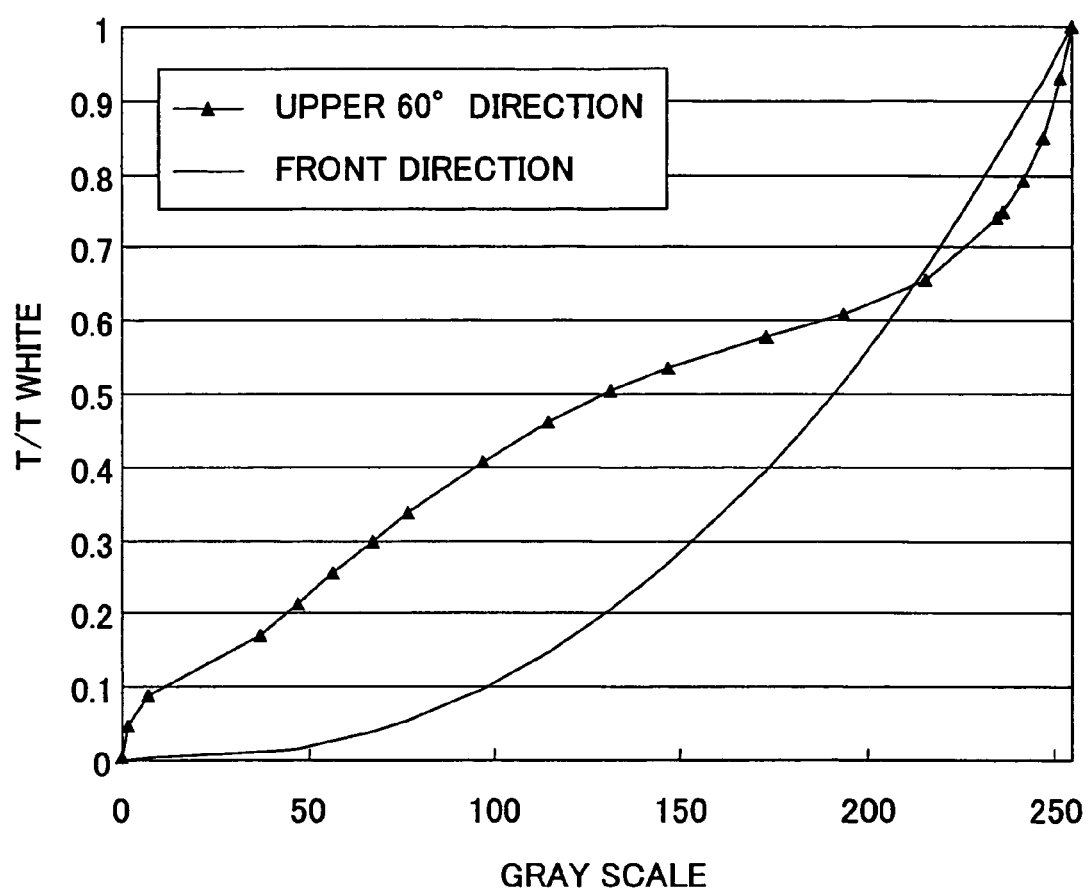
FIG. 1 is a diagram showing the T-V characteristics of a MVA liquid crystal display device according to a related art.
Figure 2A:
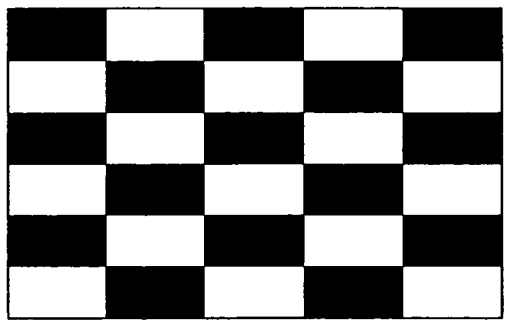
FIGS. 2A-2C are diagrams showing a testing method used for measuring a degree of image burning.
Figure 2B:
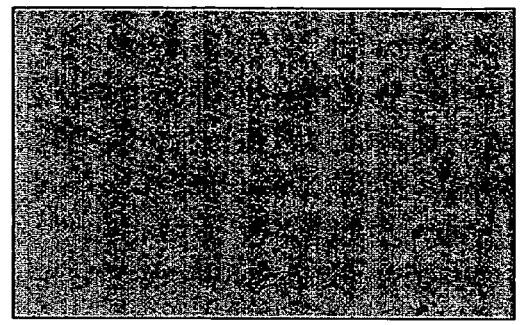
Figure 2C:
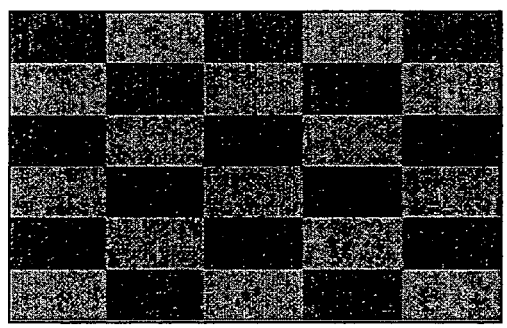
Figure 3:
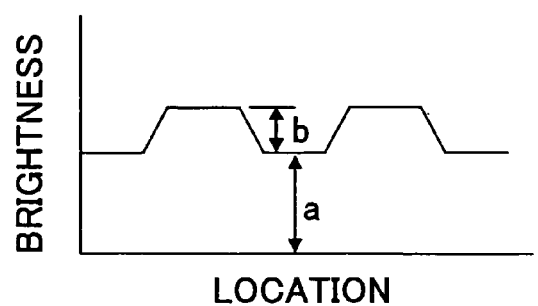
FIG. 3 is a diagram explaining the calculation of a burning ratio.
Figure 4A:
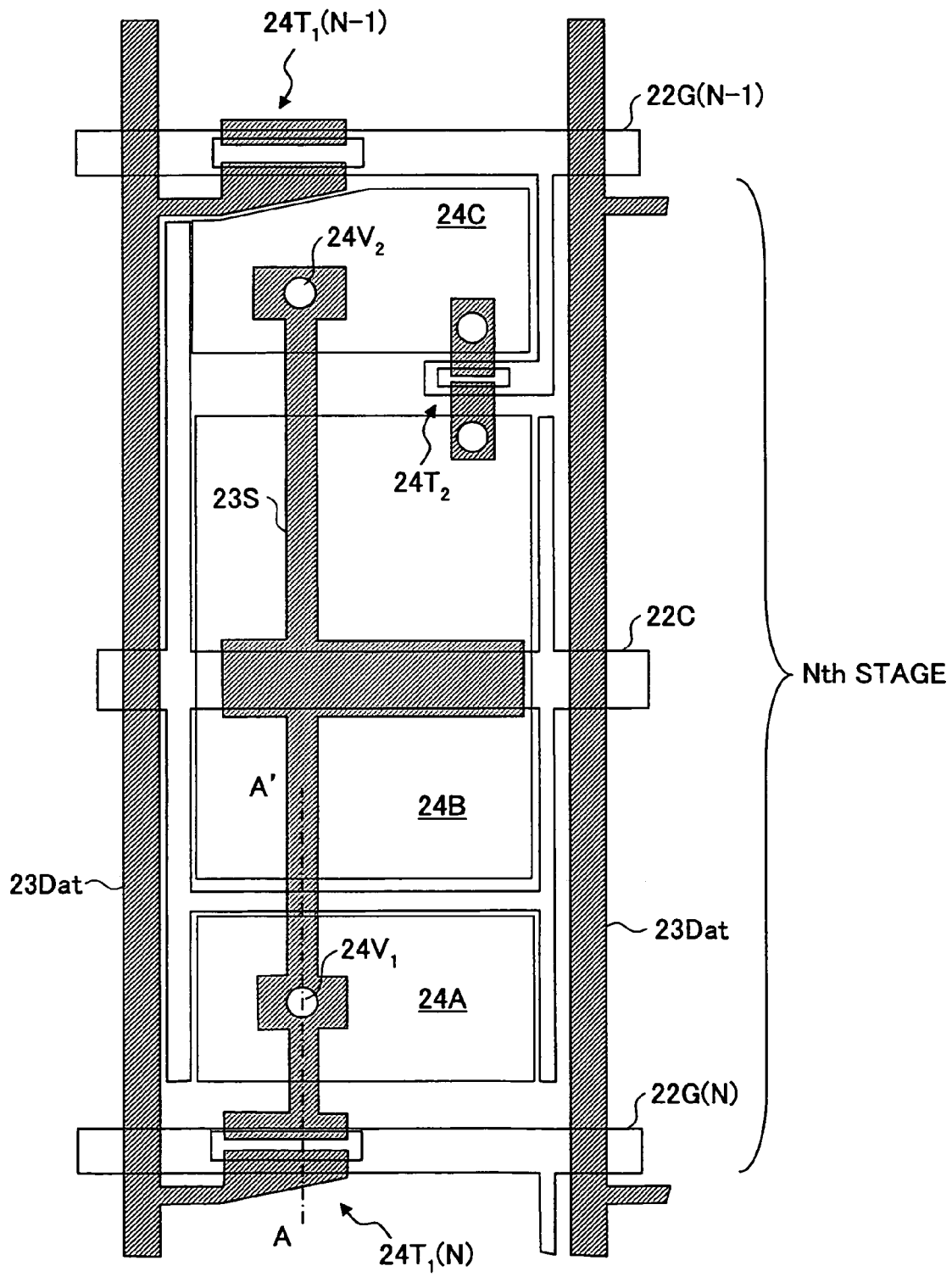

FIGS. 4A-4C are diagrams showing the construction of a liquid crystal display device 20 according to a related part of the present invention, wherein FIG. 4A shows a single picture element formed on a TFT substrate in a plan view, FIG. 4B shows a cross-sectional view of the single picture element taken along a line A-A' of FIG. 4A, while FIG. 4C is an equivalent circuit diagram corresponding to the construction of FIGS. 4A and 4B.

Referring to the cross-sectional diagram of FIG. 4B at first, the liquid crystal display device 20 includes glass substrates 21A and 21B opposing with each other and a liquid crystal layer 22 confined therebetween, wherein there are formed a gate bus line 22 G and an accumulation capacitance bus line 22C on the glass substrate 21A.

The gate bus line 22G and the accumulation capacitance bus line 22C are covered by an insulation film 22Gox constituting a gate insulation film of a TFT $24T_1$, and a channel layer 22Ch of amorphous silicon or polysilicon is formed on the gate insulation film 22GOx in correspondence to the gate bus line 22G as the channel of the TFT $24T_1$.

On the channel layer 22Ch, there is formed a channel stopper pattern 22N of SiN, or the like, and amorphous silicon patterns 22S and 22D of n$^+$-type or p$^+$-type are formed on the gate insulation film 22GOx at both lateral sides of the channel stopper pattern 22N so as to cover the both edges of the channel layer 22Ch as the source region and drain region of the TFT $24T_1$. Further, a source electrode 23S and a drain electrode 23D are formed on the amorphous silicon pattern 22S, wherein the source electrode 23S extends over the gate insulation film 22Gox and forms a control electrode. Further, as shown in FIG. 4A, the drain electrode 23D is connected to a data bus line 23Dat.

Further, an interlayer insulation film 24 is formed on the gate insulation film 22GOx so as to cover the TFT $24T_1$ and the source and drain electrodes 23S and 23D, and a sub-picture element electrode 24A and another sub-picture element electrode 24B are formed on the interlayer insulation film 24, such that the sub-picture element electrode 24A is connected to the control electrode 23S via a contact hole $24V_1$, while the sub-picture element electrode 24B is separated from the sub-picture element electrode 24A. Further, an alignment film 25A is formed on the interlayer insulation film 24 so as to cover the sub-picture element electrodes 24A and 24B. Further, the sub-picture element electrode 24B achieves capacitance coupling with the control electrode 23S.

On the other hand, there is formed a uniform common electrode 22CM on the opposing substrate 21B via a color filter layer 22F, and an alignment film 25B is formed on the common electrode 22CM. Thereby, the liquid crystal layer 22 is held in the state of contacting with the alignment films 25A and 25B.

Next, reference is made to the plan view diagram of FIG. 4A.

Referring to FIG. 4A, there extend the gate bus line 22G and the accumulation capacitance bus line 22C over the glass substrate 21A from left to right, and data bus lines 23Dat extend vertically in the plane of drawing at the same level of the source electrode 23S and the drain electrode 23D. Thereby, the data bus line 23Dat is connected to the drain electrode 23D of the TFT $24T_1$ as noted before.

With the construction of FIG. 4A, there is formed a sub-picture element electrode 24C in addition to the foregoing sub-picture element electrodes 24A and 24B in the picture element region corresponding to the TFT $24T_1$, in such a manner that the sub-picture element electrode 24B is located between the sub-picture element electrodes 24A and 24C, wherein the sub-picture element electrode 24C is connected to the control electrode 23S by a contact hole $24V_2$ similar to the contact hole $24V_1$. Thus, the sub-picture element electrode 24C is connected directly to the TFT $24T_1$ similarly to the sub-picture element electrode 24A.

FIG. 4C shows an equivalent circuit diagram corresponding to the construction of FIGS. 4A and 4B.

Referring to FIG. 4C, the capacitor $C_{LC1}$ corresponds to the foregoing directly connected sub-picture element electrodes 24A and 24C and is driven by the TFT $24T_1$. A drive voltage Vpx1 is applied to the capacitor $C_{LC1}$. Further, an accumulation capacitance Cs is connected parallel to the capacitor $C_{LC1}$.

On the other hand, the capacitor $C_{LC2}$ corresponds to the floating sub-picture element electrode 24B and is driven by the TFT $24T_1$ indirectly via the capacitance coupling Cc to the control electrode 23S.

With such a construction, a voltage Vpx2 given as $$V_{px2} = \frac{C_c}{C_c + C_{LC2}} \cdot V_{px1}$$

is applied to the floating sub-picture element electrode 24B via the capacitance coupling Cc in the event a voltage Vpx1 is applied to the sub-picture element electrodes 24A and 24C.

Thus, with such a construction, it becomes possible to form a region having a different V-T characteristic in the same picture element region, and the viewing angle characteristics of half-tone representation is improved significantly.

Meanwhile, with the liquid crystal display device of such a construction, there is a tendency that electric charges remain in the floating sub-picture element electrode 24B, while this leads to the problem of burning of images.

Thus, with the construction of FIG. 4A, the floating picture element electrode 24B cooperating with the TFT $24T_1$ of the N-th stage is connected to the sub-picture element electrode 24C connected directly to the TFT $24T_1$, via a second TFT $24T_2$ driven by the gate bus line 22G(N−1) of the immediately preceding stage ((N−1)th stage).

With such a construction, in which the second TFT $24T_2$ is driven by the gate bus line 22G(N−1) of the (N−1)th stage, the gate bus line 22G(N−1) being driven immediately before the gate bus line of the first TFT $23T_1$(N) of the N-th stage, the electric charges on the floating sub-picture element electrode 24B are dissipated with certainty to the sub-picture element electrodes 24A and 24A connected directly to the foregoing first TFT $24T_1$(N) of the N-th stage, immediately before writing of voltage made by the foregoing first TFT $24T_1$(N). On the other hand, in the sub-picture element electrodes 24A and 24C connected directly to the first TFT $24T_1$(N), there is conducted writing of voltage constantly, and there occurs no accumulation of excess electric charges. Similarly, there is caused discharging of excess electric charges in the floating sub-picture element electrode 24B to the picture elements 24A and 24C via the second TFT $24T_2$, and occurrence of burning of images by the accumulation of excess electric charges is eliminated.

Figure 5:
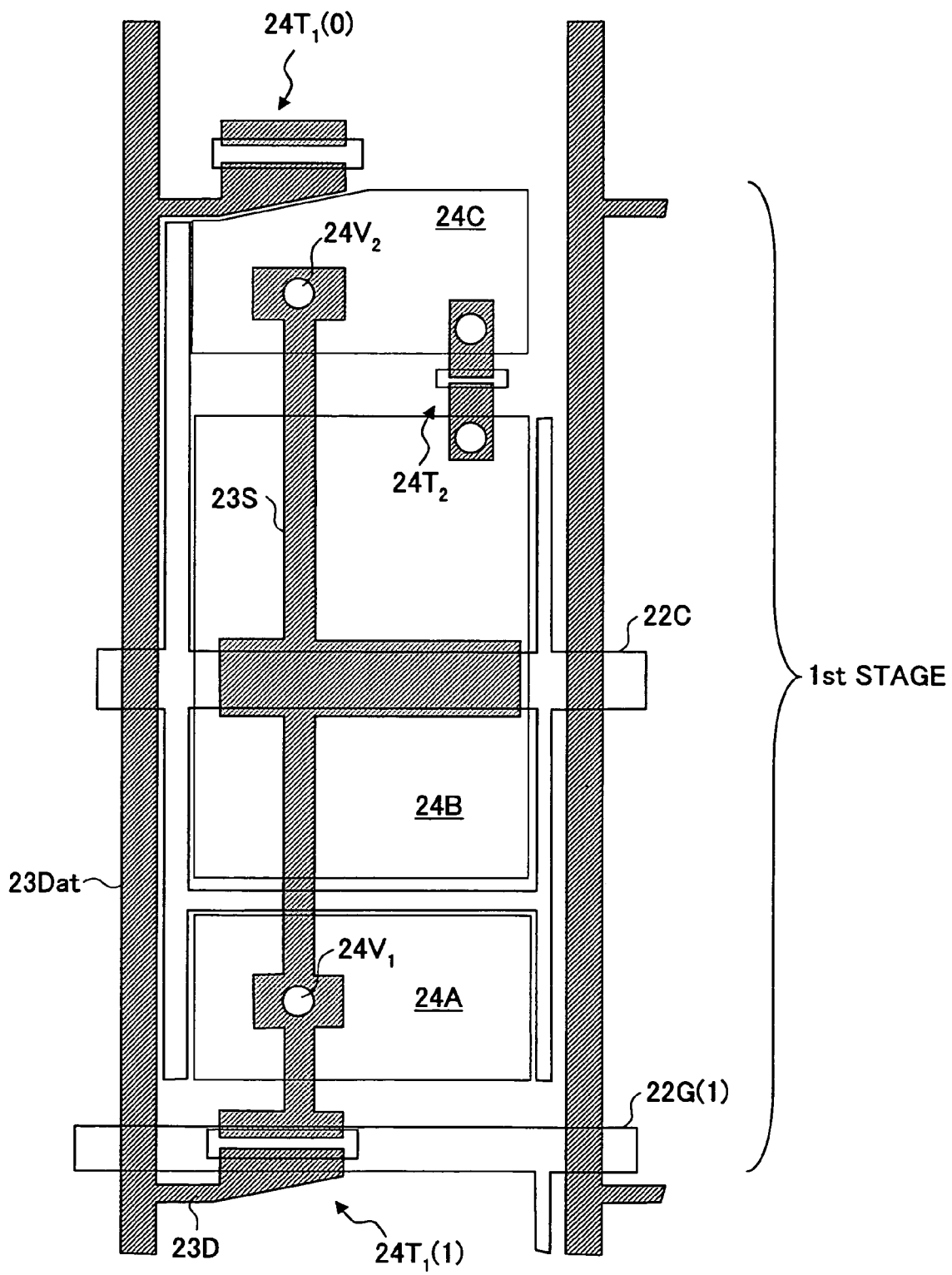
FIG. 5 is a further diagram explaining the problem addressed by the first embodiment of the present invention.

With the liquid crystal display device of such a construction, on the other hand, it should be noted that there is no gate bus line for driving the second TFT $24T_2$ provided between the sub-picture element electrodes 24B and 24C in the first stage as can be seen in FIG. 5. Accordingly, it is not possible to drive the second TFT $24T_2$ of the first stage, and it is not possible to prevent occurrence of burning of images in the first stage.

Figure 6:
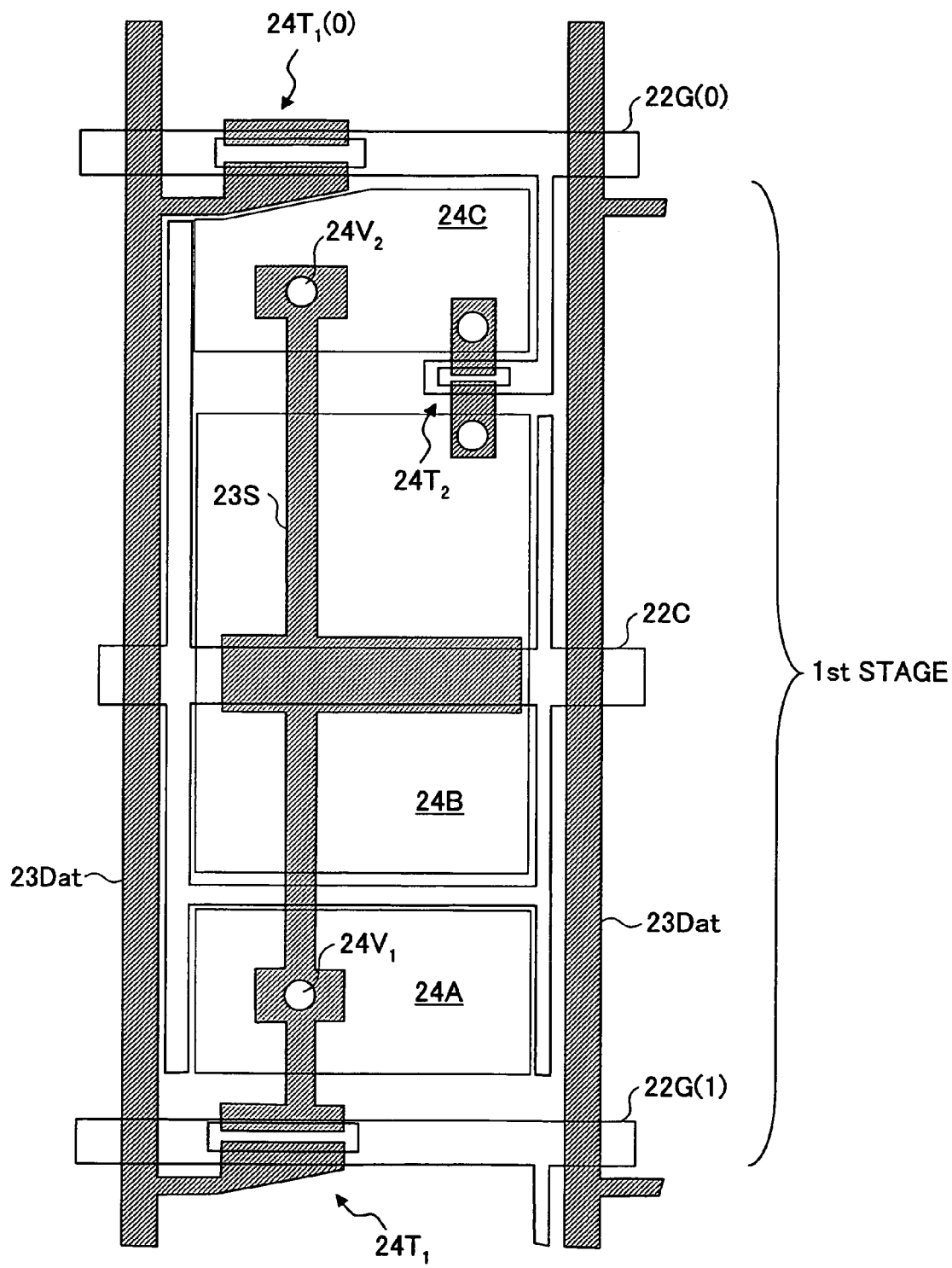
FIG. 6 is a diagram showing the construction of a liquid crystal display device according to the first embodiment of the present invention.

Thus, with the present embodiment, there is formed a gate bus line 22G(0) of zeroth stage immediately preceding the picture element of the first stage as shown in FIG. 6 and causes the second TFT $24T_2$ of the first sub-picture element to conduct by supplying a drive voltage to the gate bus line 22G(0) separately from a drive circuit immediately, before driving the TFT $24T_1$ of the first stage picture element. It should be noted that FIG. 6 shows the construction of a liquid crystal display device 20A according to the first embodiment of the present invention. In FIG. 6, those parts corresponding to the parts described previously are designated by the same reference numerals and the description thereof will be omitted.

Here, it is preferable to set the timing of driving the zero-th gate bus line 22G(0) to be identical with the timing in which the n-th gate bus line 22G(n) becomes a predetermined ON voltage before the gate bus line 22G(n+1) of the (n+1)th stage becomes the predetermined ON voltage, where n is an arbitrary number representing the number of the stages. It should be noted that, when the timing for dissipating the electric charges in one frame is increased, there is allowed a room of changing the alignment of the liquid crystal molecules by way of change of potential of the sub-picture element electrode.

Figure 7:
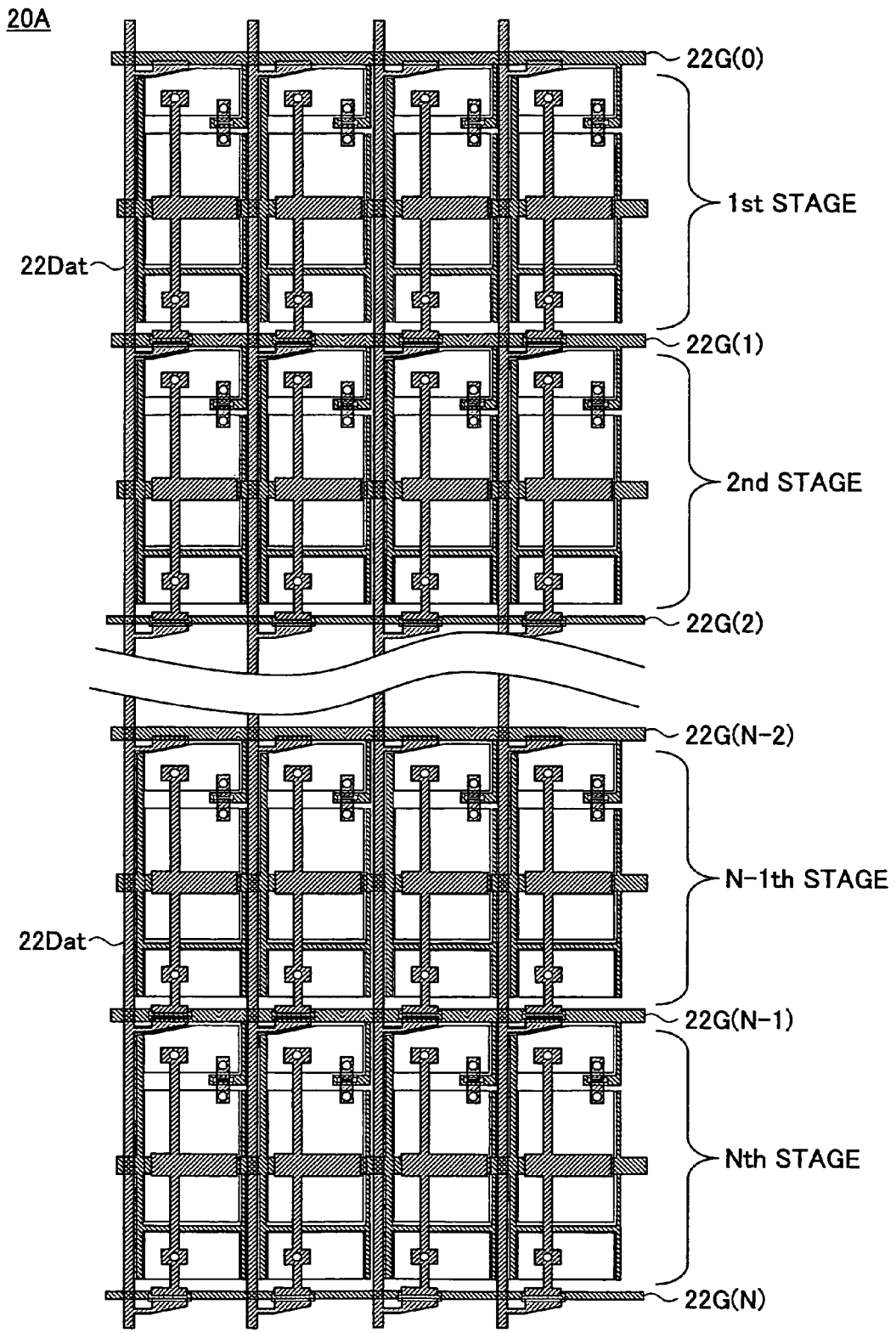
FIG. 7 is a diagram showing the overall construction of a liquid crystal display device according to the first embodiment of the present invention.

FIG. 7 shows the pattern of picture elements of the liquid crystal display device 20A formed on the TFT substrate 21A starting from the first stage to the N-th (last) stage. Thereby, it should be noted that the picture element of the first stage is selected in the beginning of a frame, while the picture element of the N-th stage is selected at the end of the frame.

Second Embodiment

Figure 8:
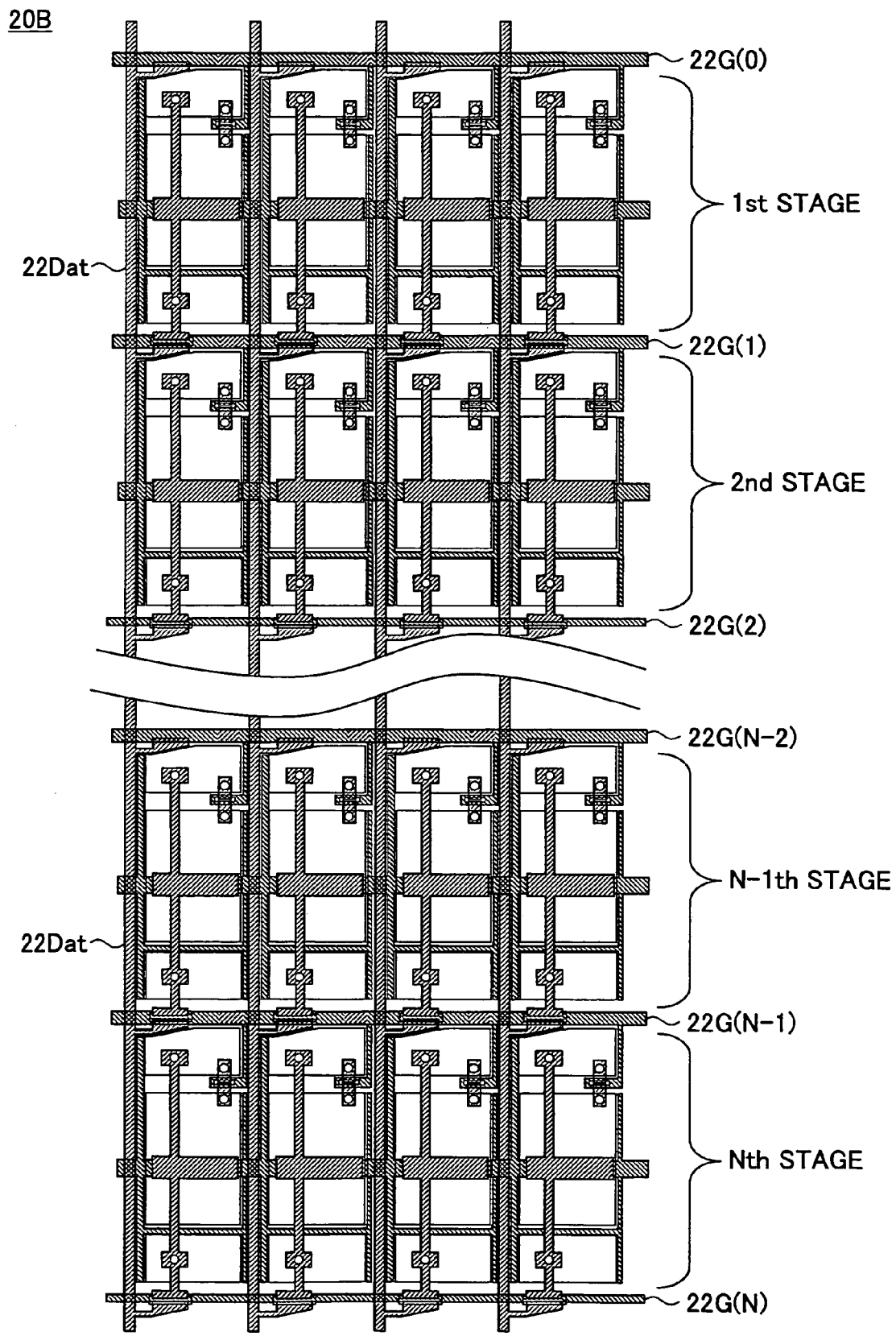
FIG. 8 is a diagram showing the construction of a liquid crystal display device according to a second embodiment of the present invention.

FIG. 8 is a diagram showing the construction of a liquid crystal display device 20B according to a second embodiment of the present invention, wherein those parts corresponding to the parts decried previously are designated by the same reference numerals and the description thereof will be omitted.

The present embodiment corresponds to the case that there is little operational margin in the driver integrated circuit device. Thus, with the present embodiment, the gate bus line driven at the end of the frame and the gate bus line newly added with the present invention are connected electrically and are driven at the same time. Thus, with the embodiment of FIG. 8, the construction of the liquid crystal panel is identical with the construction of FIG. 7, and only the driving circuit is changed.

By driving the gate bus lien G(N), which is driven at the end of the frame, concurrently with the newly added gate bus line G(0), the electric charges on the floating sub-picture element electrode 24B of the first stage are dissipated to the sub-picture element electrode 24C, which is driven directly, and it becomes possible to suppress the burning of images of the first stage similarly to the embodiment of FIG. 7.

Third Embodiment

Figure 9:
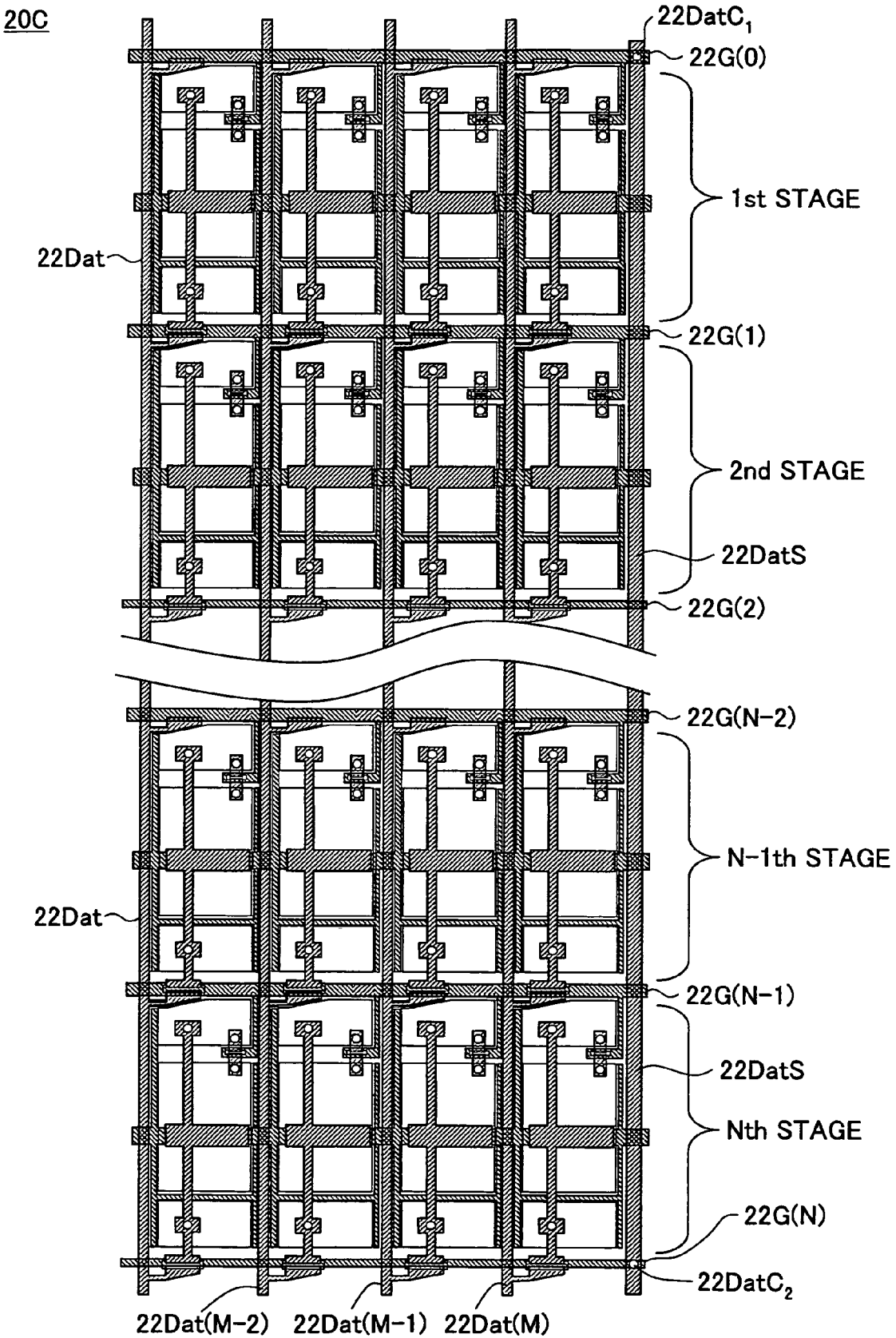
FIG. 9 is a diagram showing the construction of a liquid crystal display device according to a third embodiment of the present invention.

FIG. 9 shows the construction of a liquid crystal display device 20C according to a third embodiment of the present invention, wherein those parts corresponding to the parts described previously are designated by the same reference numerals and the description thereof will be omitted.

With the embodiment of FIG. 8, there is a need of modifying the drive circuit, and thus, there is a need of work load for modifying the circuit design.

With the present invention, a data bus line 22DatS used for connecting the newly added gate bus line G(0) and the gate bus line G(N) driven last is formed further outside of the outermost data bus line 22Dat(M). Thereby, the additional data bus line 22DatS is connected electrically to the additional gate bus line 22G(0) via a contact hole 22DatC1 and further to the last gate bus line 22G(N) via another contact hole 22DatC2.

With this, it becomes possible to suppress the burning of images by driving the newly added gate bus line 22G(0), without changing the driving circuit or driving method at all.

Fourth Embodiment

Figure 10:
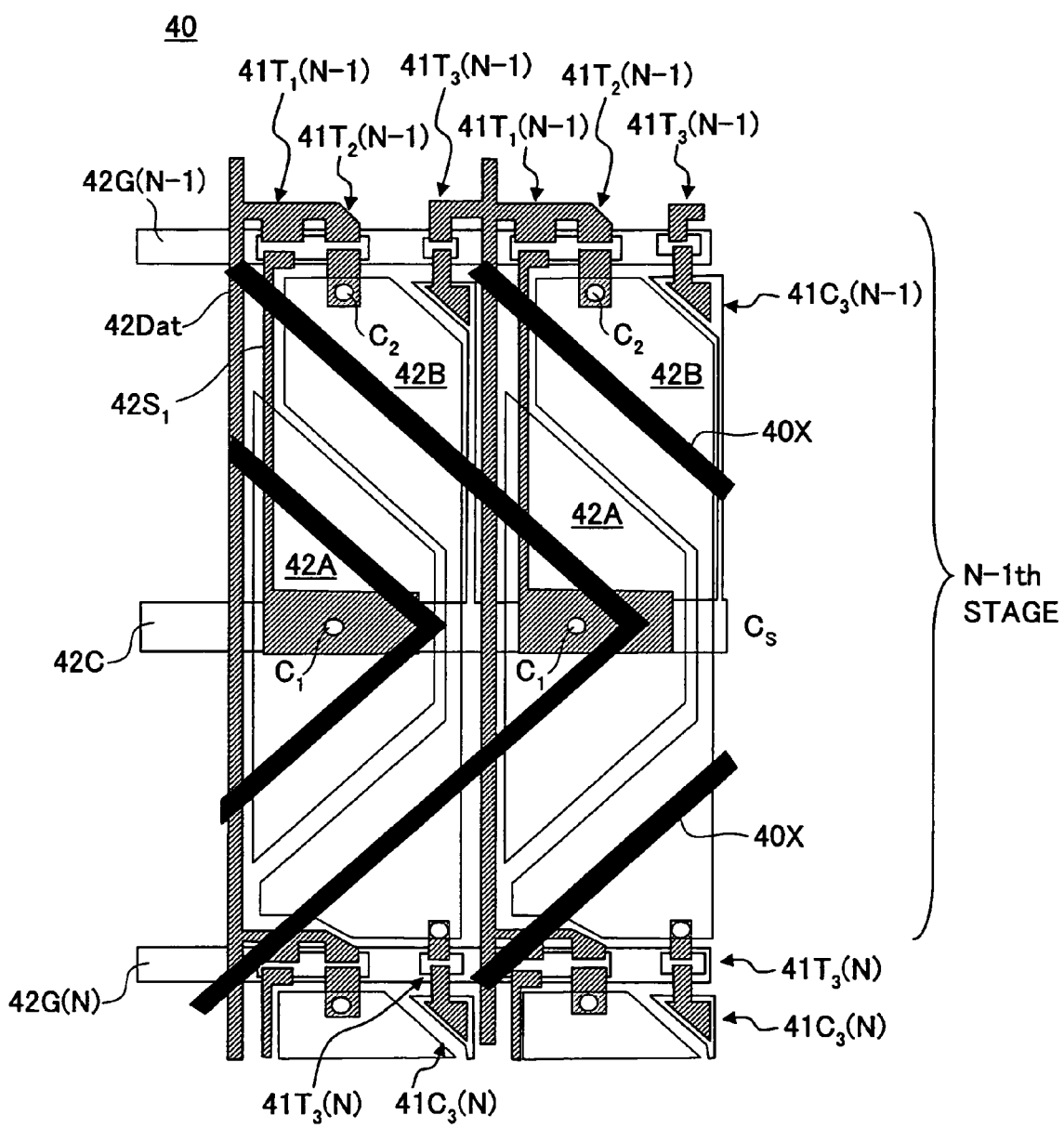
FIG. 10 is a diagram explaining the problem addressed by a fourth embodiment of the present invention.

FIG. 10 is a plan view diagram showing the construction of a liquid crystal display device 40 according to a related art of a fourth embodiment of the present invention.

Referring to FIG. 10, the liquid crystal display device 40 has a TFT substrate and an opposing substrate similar to those of FIG. 4B but not illustrated, and a liquid crystal layer is confined therebetween.

With the liquid crystal display device 40, gate bus lines 42G extend from right to left on the TFT substrate in the plane of illustration, and data bus lines 42Dat extend vertically in the plane of the drawing. Further, a TFT $41T_1$ and a TFT $41T_2$ are formed on the same gate bus line 42G in correspondence to the intersection of the gate bus line 42G and the data bus line 42Dat.

The construction of FIG. 10 is formed repeatedly on the display area of the liquid crystal display device 40, and the gate bus lines 42G are selected consecutively from the first stage to the n-th stage during the interval of one frame.

Here, the picture element of the (N−1)th stage is considered.

The TFT $41T_1$ of the (N−1)th stage is driven by a gate bus line 42G(N−1), wherein it will be noted that the drain electrode of the TFT $41T_1$ is connected to the data bus line 42Dat and the extension part $42S_1$ of the source electrode is connected to the first sub-picture element electrode 42A via a contact hole C1. Thereby, the sub-picture element electrode 42A is driven directly by the TFT $41T_1$. On the other hand, with regard to the TFT $41T_2$, the source electrode is connected to another sub-picture element electrode 42B via a contact hole C2, and as a result, the sub-picture element electrode 42B is driven directly by the TFT $41T_2$.

In FIG. 10, there is represented an alignment restriction structure by a pattern 40X, wherein it should be noted that the alignment restriction structure is actually provided on the opposing substrate and restricts the alignment of the liquid crystal molecules.

Further, with the construction of FIG. 10, there is provided a third TFT $41T_3$ on the gate bus line 42G. With the third TFT $41T_3$, the picture element electrode 42B of the preceding stage is connected to the source electrode, and the transistor $41T_3$ connects the same to a buffer capacitance formed as a part of the accumulation capacitance Cs via the drain electrode thereof. In the example of FIG. 10, for example, the TFT $T_3$(N) on the gate bus line 42G(N) connects the picture element electrode 42B of the (N−1)th stage to the corresponding buffer capacitance 41 $C_3$(N) eclectically.

Thus, in the case of driving the TFTs $41T_1$(N−1) and $41T_2$(N−1) via the gate bus line 42G(N−1) and achieve the display by the picture element electrodes 42A and 42B of the (N−1)th stage, the electric charges on the picture element electrode 42B of the (N−1)th stage are dissipated, via the TFT $41T_3$(N), to the buffer capacitance 41 $C_3$(N) cooperating therewith, by causing to conduct the TFT 41T3(N) via the gate bus line 42(N) in advance of the display.

With such a construction, the potential of the picture element electrode 42B is lowered, and the picture element electrodes 42A and 42B are driven with different characteristics while in the same picture element, and the viewing angle characteristics in the half-tone display mode is improved significantly.

Figure 11:
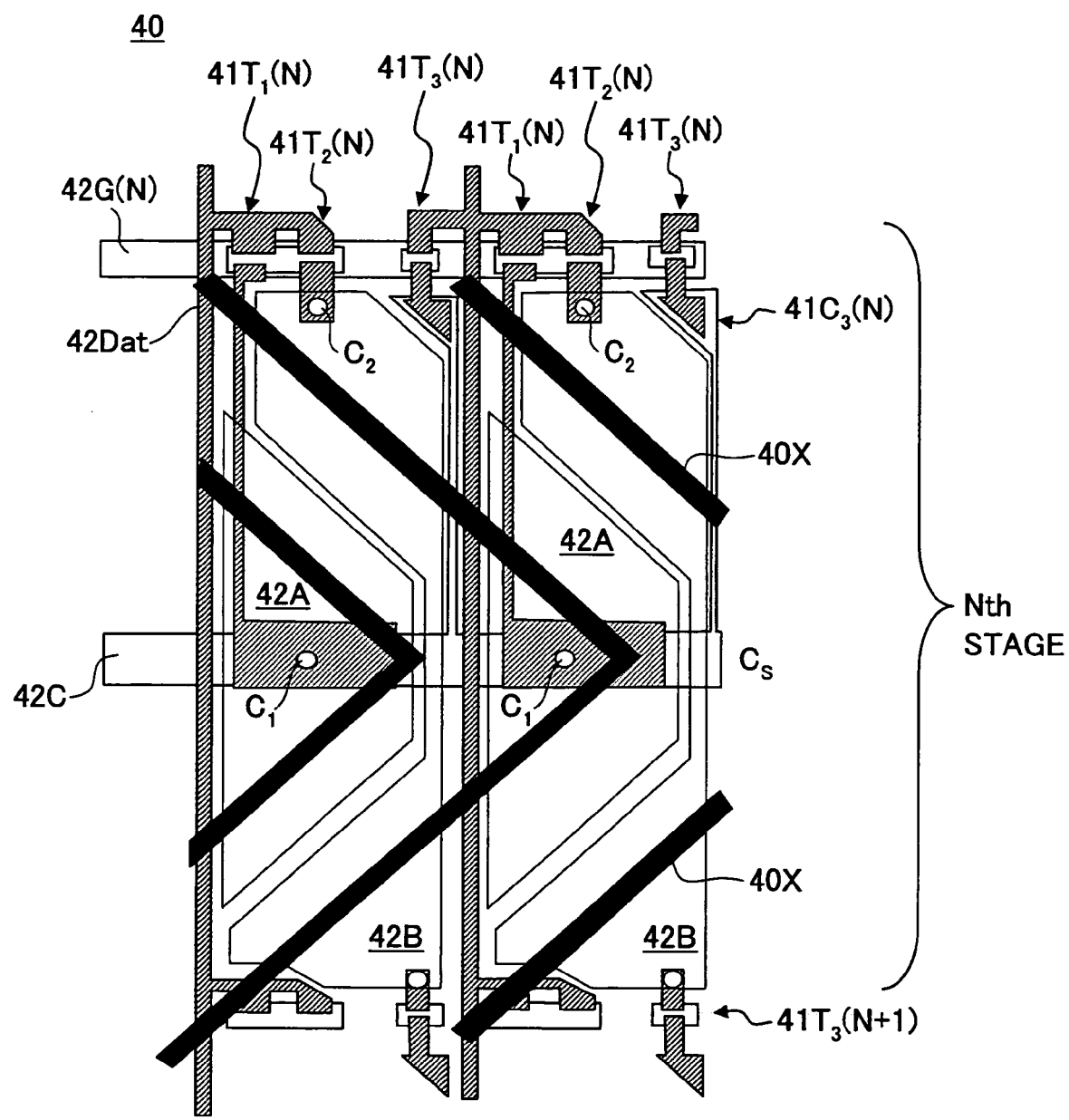
FIG. 11 is another diagram explaining the problem addressed by a fourth embodiment of the present invention.

On the other hand, the liquid crystal panel of such a construction lacks the gate bus line 42G(N+1) in the final stage (N) as represented in FIG. 11. Thus, it is not possible to drive the TFT $41T_3$(N+1). Further, there is formed no buffer capacitance $41C_3$(N+1) cooperating with the TFT $41T_3$(N+1). Thus, it is not possible with such a construction to avoid occurrence of burning of images in the sub-picture element electrode 42B of the final stage N.

Figure 12:
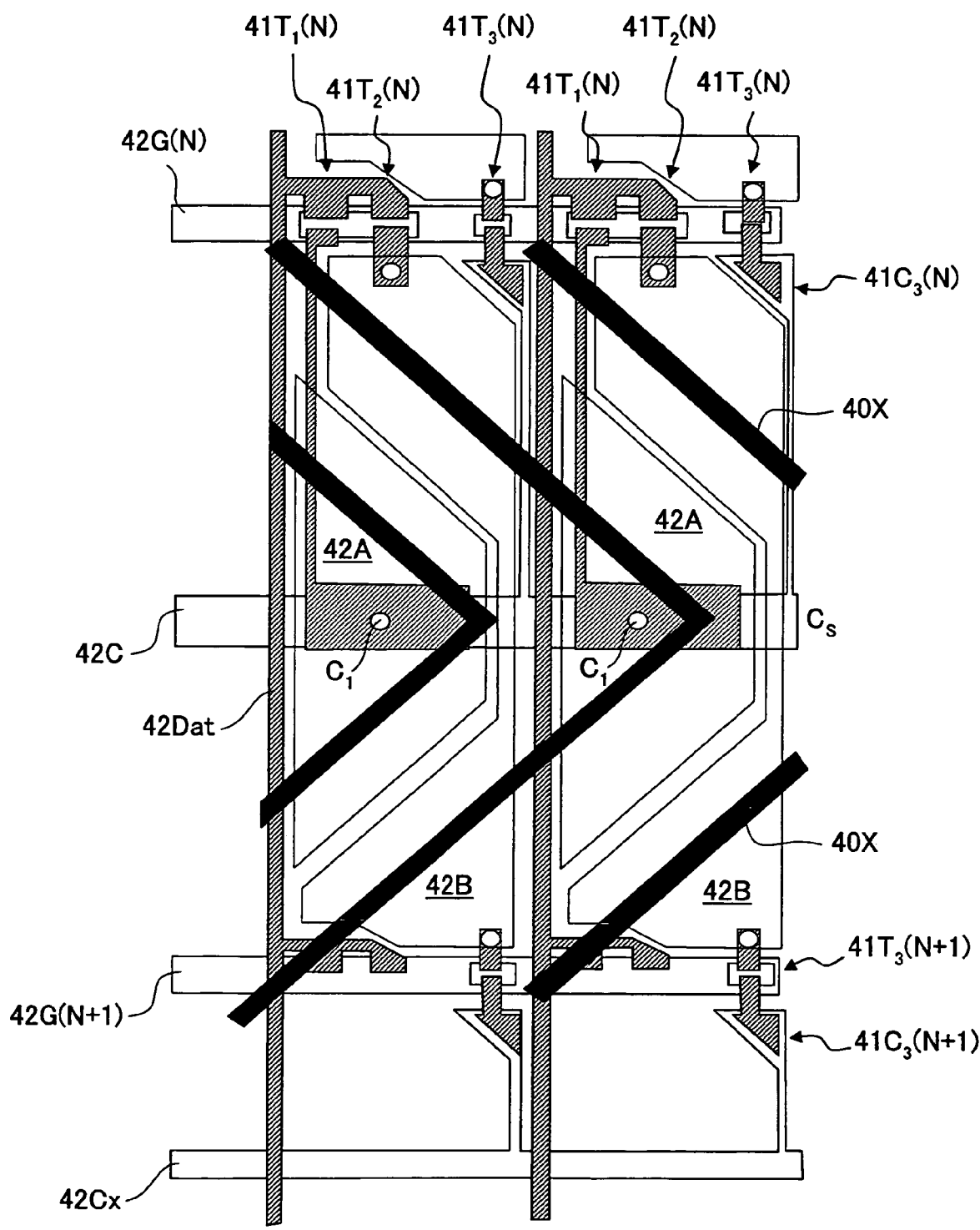
FIG. 12 is a diagram showing the construction of a liquid crystal display device according to the fourth embodiment of the present invention.

Thus, with the present invention, there is formed a gate bus electrode 42G(N+1) of the (N+1)th stage as shown in FIG. 12 for driving the TFT $41T_3$(N+1). Further, an additional bus 42Cx is formed in connection to the accumulation capacitance bus 42C and form a buffer capacitance cooperating with the TFT $41T_3$(N+1). Thus, FIG. 12 shows the construction of a liquid crystal display device 60 according to a fourth embodiment of the present invention. In FIG. 12, those parts explained previously are designated by the same reference numerals and the description thereof is omitted.

Here, it should be noted that the gate bus line 42G(N+1) may be driven as the gate bus line of the (N+1)th stage. Alternatively, the gate bus line 42G(N+1) may be driven simultaneously to the first stage by modifying the drive circuit similarly to the previous embodiment. Further, it is possible to add another data bus line as in the embodiment of FIG. 9 and connect the gate bus line 42G(N+1) with the first stage gate bus line. In this case, too, the gate bus line 42G(N+1) is driven with the same timing to the first stage gate bus line. Further, it is obvious that the same effect can be achieved when the foregoing construction is inverted right and left.

Firth Embodiment

Meanwhile, with the liquid crystal display device 60 of FIG. 12, an advantageous side effect of stabilized alignment of liquid crystal molecules is attained in the vicinity of the buffer capacitance. This advantageous side effect is caused by the reasons noted below.

With the construction of FIG. 12, the liquid crystal display device is designed to tilt the liquid crystal molecules in an oblique direction of about 45 degrees with regard to the bus line as a result of the effect of the alignment restriction structure 40X formed on the opposing electrode and further the effect of the gap between the picture element electrodes 42A and 42B, similarly to a MVA liquid crystal display device of related art. In the vicinity of the bus line 42G, however, there is caused an electric field perpendicular to the bus line, while this direction of the electric field is different from the direction in which the liquid crystal molecules are to be tilted. Thus, the alignment of the liquid crystal molecules is tend to be disturbed in the vicinity of the bus line 42G.

In the structure of FIG. 12, on the other hand, the sub-picture element electrode 42B of each picture element is adjacent to the buffer capacitance of the immediately preceding stage, and thus, there is caused an increase of potential difference therebetween in the dot-inversion drive mode because of the difference of polarity therebetween. Thus, the potential difference between the sub-picture element electrode 42B and the buffer capacitance $41C_3$ becomes predominant over the electric field caused by the peripheral bus line 42G, and the direction of tilting of the liquid crystal molecules, and hence the alignment of the liquid crystal molecules, is stabilized.

On the other hand, with regard to the picture elements of the first stage in the construction of FIG. 12, there exists no picture elements in the zero-th stage, and thus, there exists no buffer capacitance adjacent to the sub-picture element electrodes 42B of the first stage. Thereby, there is a possibility that the alignment of the liquid crystal molecules is different in the first stage as compared with the picture elements of other stages.

Figure 13:
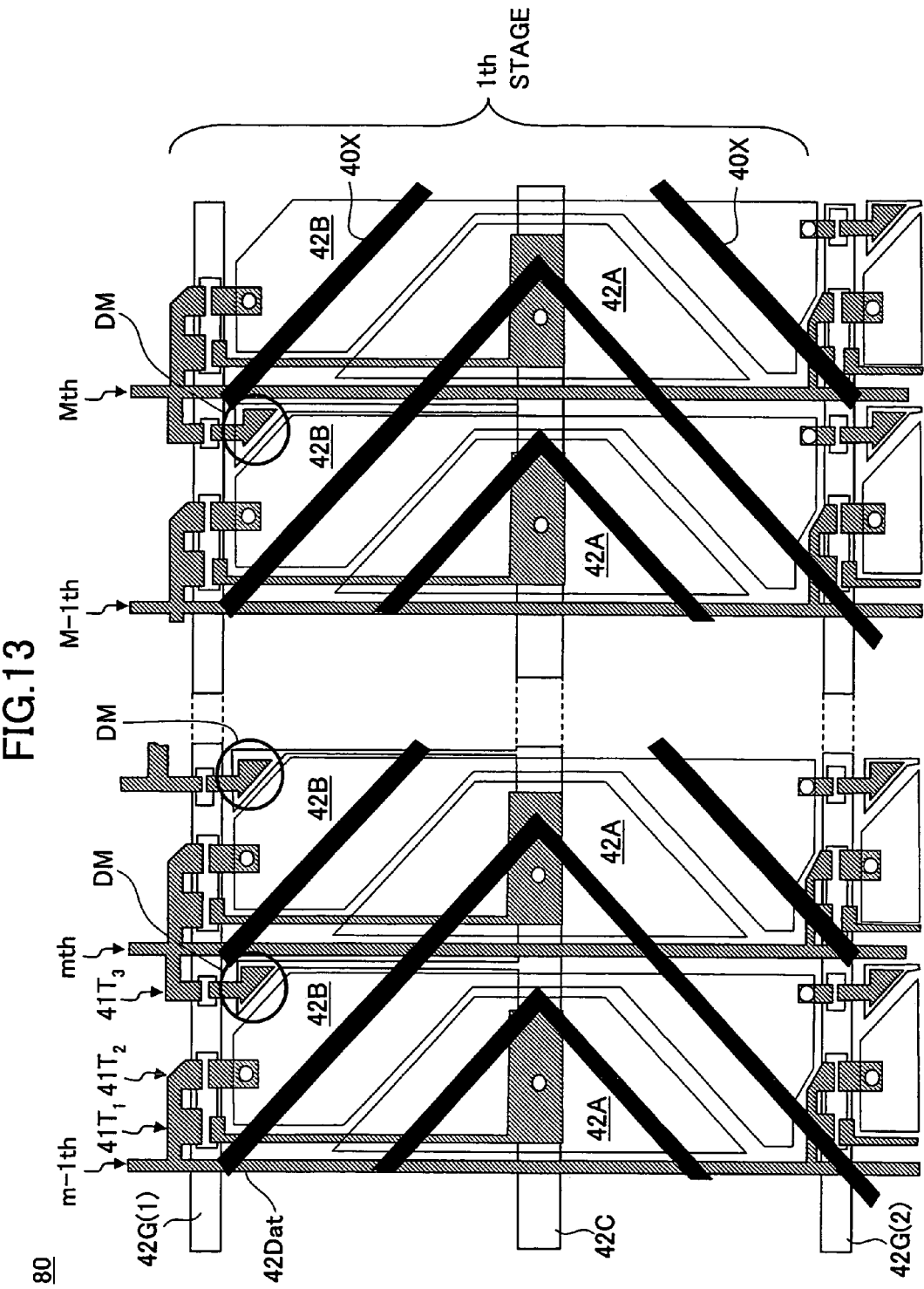
FIG. 13 is a diagram showing the construction of a liquid crystal display device according to a fifth embodiment of the present invention.

Thus, with the present embodiment, a dummy buffer capacitance DM are provided to the first stage as indicated in FIG. 13, and a drive voltage is applied to the m-th dummy buffer capacitance DM from the (m+1)th data bus line 42Dat via the TFT $42T_3$. For this purpose, the construction of FIG. 14 includes a branched pattern branching the data bus line 42Dat to the drain of the TFT $41T_3$.

Thus, FIG. 13 shows the construction of a liquid crystal display device 80 according to a fifth embodiment of the present invention. In FIG. 13, it should be noted that those parts corresponding to the parts described previously are designated by the same reference numerals and the description thereof will be omitted.

Here, it should be noted that the voltage of the data bus line 42Dat itself changes variously, but the polarity thereof is not changed after the gate bus line 41G(1) of the first stage is driven, until the gate bus line 42G(N) of the N-th stage is driven. Thus, the state in which the dummy buffer capacitance DM and the sub-picture element capacitance 42B of the first stage have different polarities is maintained, and a large voltage difference is maintained therebetween. As a result, the alignment of the liquid crystal molecules is maintained.

Sixth Embodiment

Figure 14:
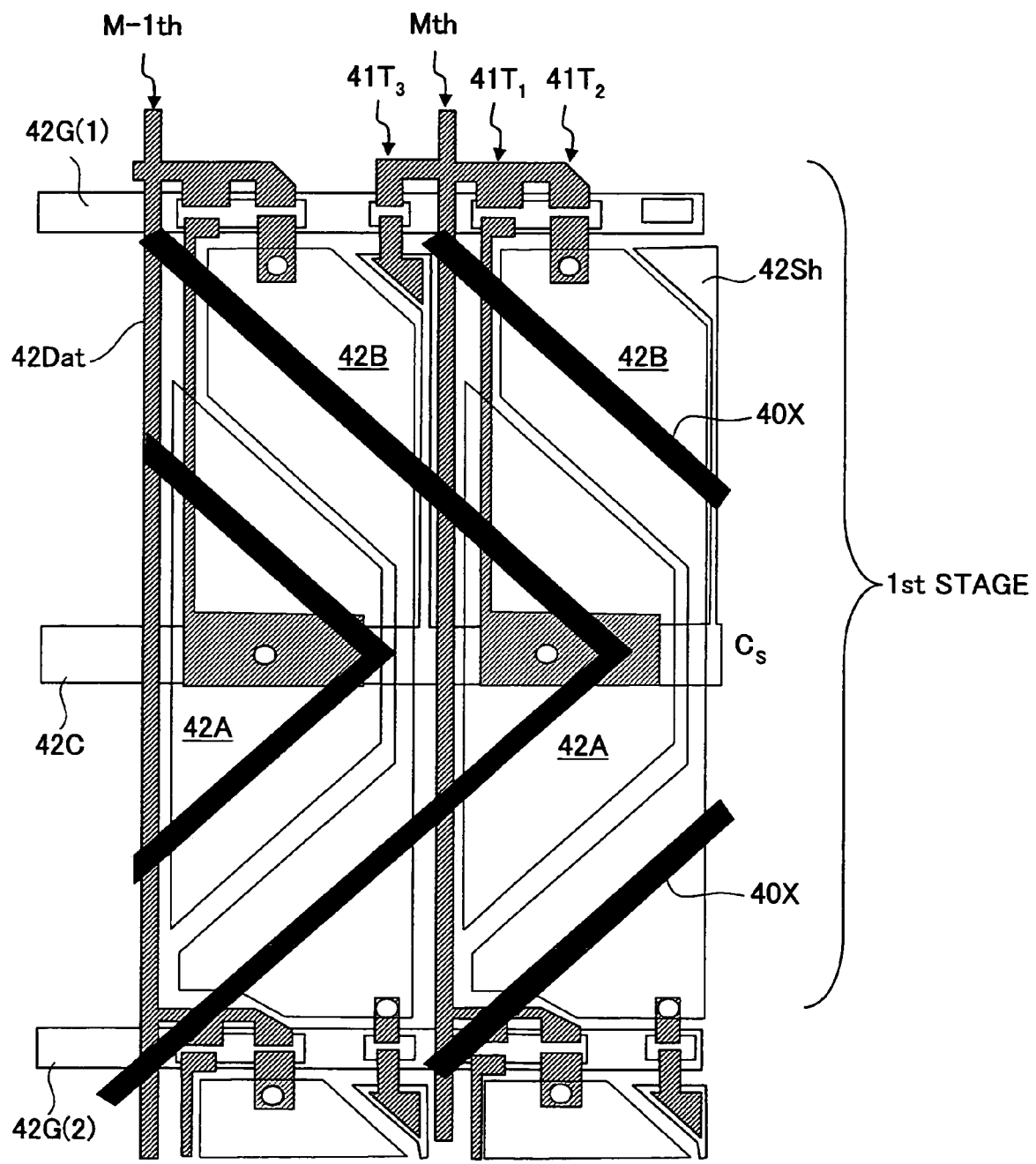
FIG. 14 is a diagram showing the construction of a liquid crystal display device according to a sixth embodiment of the present invention.

FIG. 14 shows the construction of a liquid crystal display device 80A according to a modification of the liquid crystal display device 80 of FIG. 13, wherein those parts corresponding to the parts described previously are designated by the same reference numerals and the description thereof will be omitted.

With the construction of FIG. 13, it should be noted that there is provided no M-th data bus line in the first stage for driving the dummy buffer capacitance corresponding to the picture element.

Thus, in FIG. 13A, there is formed a blank region in the M-th picture element of the first stage in which no dummy buffer is formed, and thus, the potential is not controlled in such a blank region. When such a blank region is formed, there is a possibility that accumulation of electric charges takes place at the boundary between the alignment film and the insulation layer, or the like, by the effect of the electric field of the bus line nearby, while such accumulation of electric charges may invite the problem of leakage of light at the time of black representation mode.

Thus, in order to shield this blank region optically, the construction of FIG. 14 causes the first accumulation capacitance bus line to form a branch that constitutes a shading pattern 42Sh. Further, in place of forming the shading pattern 42Sh, it is possible to provide a black matrix on the opposing substrate in correspondence to the part where the shading pattern 42Sh of FIG. 13 is formed.

Seventh Embodiment

Figure 15:
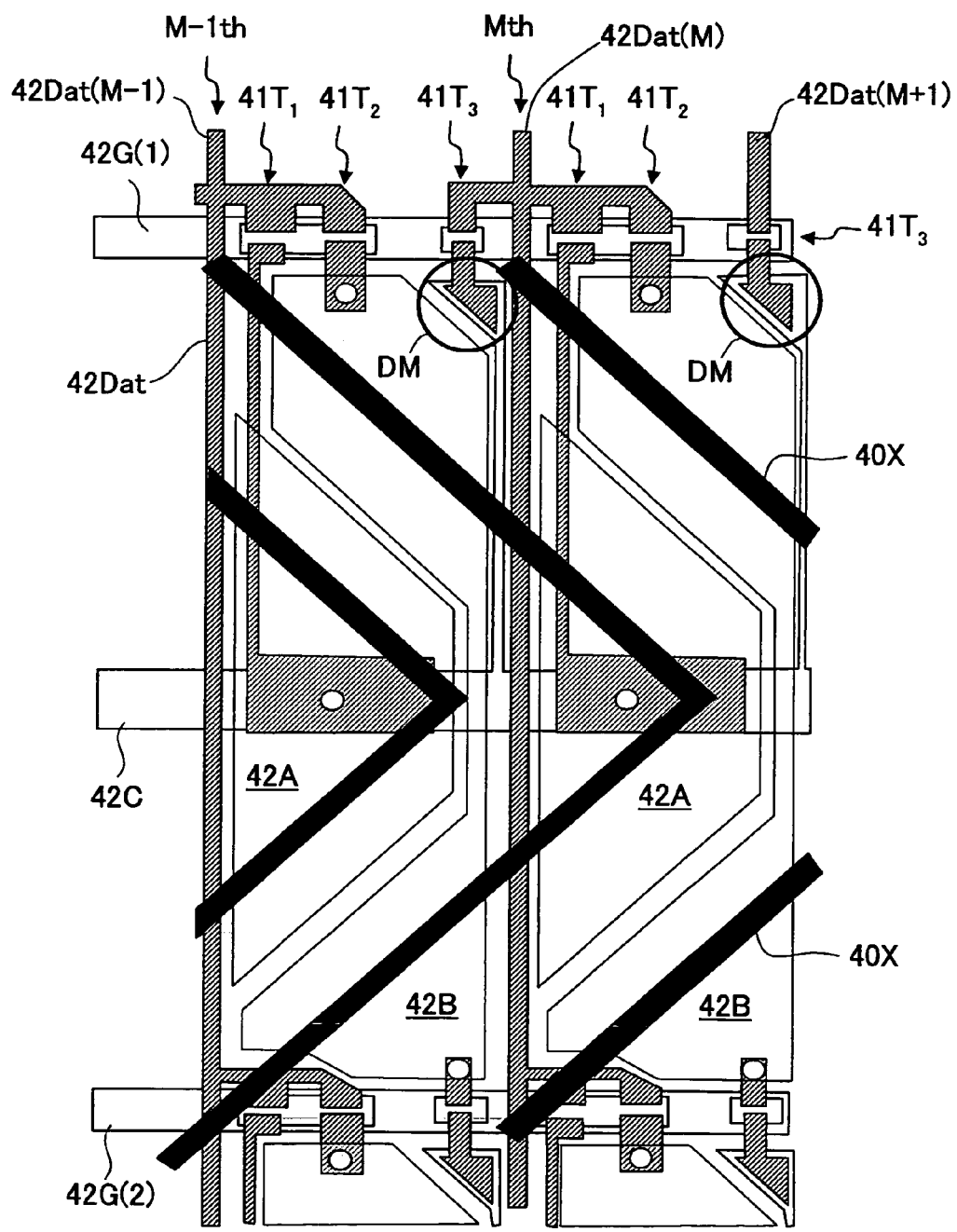
FIG. 15 is a diagram showing the construction of a liquid crystal display device according to a seventh embodiment of the present invention.

FIG. 15 shows the construction of a liquid crystal display device 80B according to a further modification of the liquid crystal display device of FIG. 14.

In the embodiment of FIG. 14, the shading pattern 42Sh is provided merely for the purpose of optical shielding, and thus, there may appear a difference of stability in the alignment of liquid crystal molecules at the corner part of the M-th picture element of the first stage or at the edge of the first stage, as compared with other picture elements of the first stage.

Thus, with the present embodiment, a dummy buffer capacitance similar to other picture elements is provided also to the optical shielding part realized by the shading pattern 42Sh, and the dummy buffer capacitance thus formed is driven by a TFT $41T_3$ provided in correspondence thereto.

Referring to FIG. 15, the present embodiment forms a dummy buffer capacitance DM similar to those of the first through (M−1)th picture elements of the first stage also in the M-th picture element by using the shading pattern 42Sh and further forms a TFT $41T_3$ on the gate bus line 41G(1) in cooperation with the foregoing dummy buffer capacitance DM of the M-th picture element.

Further, with the embodiment of FIG. 15, the voltage of reverse polarity to the voltage on the M-th data bus line 42Dat is supplied to the TFT 41T₃ via the (M+1)th data bus line 42Dat(M+1).

With the foregoing construction, the liquid crystal molecules in the M-th picture element of the first stage are aligned similarly to the liquid crystal molecules of other picture elements of the first stage, including the neighborhood of the dummy buffer capacitance DM.

Further, the present invention is not limited to the embodiments described heretofore, but various variations and modifications may be made without departing from the scope of the invention.

The present invention is based on the Japanese priority application 2005-156089 filed on May 27, 2005, the entire contents of which are incorporated herein as reference.

What is claimed is:

1. A liquid crystal display device, comprising:
    first and second substrates disposed so as to oppose with each other;
    a liquid crystal confined between the first and second substrates;
    a plurality of gate bus lines and a data bus line formed on said first substrate, said plurality of gate bus lines and said data bus line occupying an area on said first substrate, said plurality of gate bus lines including a first gate bus line located at an edge of said area;
    a plurality of first transistors formed on said first substrate and respectively connected to corresponding one of said gate bus lines and said data bus line, said plurality of first transistors including a transistor driven by a signal on said first gate bus line upon selection;
    a plurality of sub-picture element electrodes formed on said first substrate in each picture element region defined by one of said plurality of gate bus lines and said data bus line, said picture element region defined by said first gate bus line and said data bus line including a first sub-picture element electrode and a second sub-picture element electrode;
    a control electrode formed, in each picture element region, on said first substrate in capacitance coupling with at least one of said plurality of sub-picture element electrodes, said control electrode being applied with a display voltage from said data bus line via said first transistor; and
    an auxiliary capacitance bus line held, in each picture element region, at a predetermined voltage level and constituting an auxiliary capacitance between said auxiliary capacitance bus line and said control electrode,
    wherein there is provided a second transistor, in each said picture element region, between one of said plurality of sub-picture element electrodes coupled with said control electrode by said capacitance coupling and said auxiliary capacitance bus line or between one of said plurality of sub-picture element electrodes coupled with said control electrode by said capacitance coupling and one of said plurality of sub-picture element electrodes connected to said first transistor, said second transistor being driven, in each said picture element region, by a signal in one of said plurality of gate bus lines different from said gate bus line to which said first transistor is connected,
    wherein said liquid crystal display device further comprises an additional gate bus line different from any of said plurality of gate bus lines at an outside of said area on said first substrate and is adjacent to said picture element region defined by said first gate bus line and said data bus line, said additional gate bus line lacking any transistor that supplies, upon selection of said additional gate bus line, a signal on said data bus lines to any of said sub-picture element electrodes of any of said picture element regions on said first substrate, and
    wherein said picture element region defined by said first gate bus line includes an additional second transistor between said first sub-picture element electrode and said second sub-picture element electrode, said additional second transistor being driven by a signal on said additional gate bus line.

2. The liquid crystal display device as claimed in claim 1, wherein said gate bus line provided in said stage preceding to said first stage is connected electrically to a gate bus line controlling a picture element of a final stage.

3. The liquid crystal display device as claimed in claim 1, wherein said gate bus line provided in a stage preceding to said first stage is connected electrically to a gate bus line controlling a picture element of a final stage in a circuit that controls said gate bus line of said stage preceding to said first stage and said gate bus line of said final stage.

4. The liquid crystal display device as claimed in claim 1, wherein there is provided a bus line parallel to said data bus line so as to connect a gate bus line provided in said stage preceding to said first stage and a gate bus line controlling a picture element of a final stage.

5. The liquid crystal display device as claimed in claim 1, further comprising a plurality of data bus lines including said data bus line, said plurality of gate bus lines and said plurality of data bus lines defining respective, corresponding picture element regions.

* * * * *